(12) United States Patent
Tiemann

(10) Patent No.: US 9,151,598 B2
(45) Date of Patent: Oct. 6, 2015

(54) POSITION MEASURING DEVICE

(75) Inventor: Marc Tiemann, Salzburg (AT)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 14/007,432

(22) PCT Filed: Jan. 19, 2012

(86) PCT No.: PCT/EP2012/050783
§ 371 (c)(1),
(2), (4) Date: Sep. 25, 2013

(87) PCT Pub. No.: WO2012/130490
PCT Pub. Date: Oct. 4, 2012

(65) Prior Publication Data
US 2014/0022561 A1    Jan. 23, 2014

(30) Foreign Application Priority Data
Mar. 30, 2011   (DE) .................. 10 2011 006 424

(51) Int. Cl.
G01B 11/00    (2006.01)
G01B 11/14    (2006.01)
H04Q 9/00     (2006.01)
G01D 21/00    (2006.01)

(52) U.S. Cl.
CPC ............. *G01B 11/14* (2013.01); *G01D 21/00* (2013.01); *H04Q 9/00* (2013.01); *H04Q 2209/43* (2013.01)

(58) Field of Classification Search
CPC ................................ G01B 11/14; G01B 11/00
USPC .......................................................... 356/614
See application file for complete search history.

(56) References Cited

U.S. PATENT DOCUMENTS

| | | | |
|---|---|---|---|
| 5,557,154 A * | 9/1996 | Erhart .............................. | 310/80 |
| 5,565,864 A * | 10/1996 | Ohno et al. ..................... | 341/1 |
| 5,574,445 A * | 11/1996 | Maresca et al. ................. | 341/10 |
| 6,278,363 B1 * | 8/2001 | Bezek et al. .................... | 340/442 |
| 6,693,565 B2 * | 2/2004 | Kusumi et al. .................. | 341/11 |
| 7,244,929 B2 * | 7/2007 | Rodi .......................... | 250/231.18 |
| 7,486,182 B2 | 2/2009 | Hahn et al. | |
| 8,129,984 B2 * | 3/2012 | Hosek et al. ............. | 324/207.24 |
| 8,246,441 B2 * | 8/2012 | Bleich et al. ................... | 463/20 |
| 8,355,689 B2 | 1/2013 | Probst et al. | |

(Continued)

FOREIGN PATENT DOCUMENTS

| DE | 103 06 231 | 8/2004 |
|---|---|---|
| DE | 10 2006 041 056 | 3/2008 |

(Continued)

OTHER PUBLICATIONS

International Search Report, mailed May 7, 2012, issued in corresponding International Application No. PCT/EP2012/050783.

*Primary Examiner* — Roy M Punnoose
(74) *Attorney, Agent, or Firm* — Kenyon & Kenyon LLP

(57) ABSTRACT

A position measuring device includes a position detection unit, which may be used to process positional signals that result from scanning a code track by a scanning unit, into digital positional values, a first interface unit for the communication with a control unit via a data transmission channel, and a second interface unit for the communication with at least one peripheral unit. The first interface unit is a hardwired interface, and the second interface unit is a wireless radio interface.

13 Claims, 3 Drawing Sheets

(56) References Cited

U.S. PATENT DOCUMENTS

| | | | |
|---|---|---|---|
| 8,483,908 B2 * | 7/2013 | Carresjo et al. | 701/36 |
| 8,546,706 B2 * | 10/2013 | Altman et al. | 178/19.02 |
| 8,744,692 B2 * | 6/2014 | Carresjo et al. | 701/48 |
| 2009/0102461 A1 * | 4/2009 | Santos et al. | 324/207.2 |
| 2009/0253388 A1 | 10/2009 | Kielb et al. | |
| 2010/0019135 A1 | 1/2010 | Eckert et al. | |
| 2010/0256874 A1 * | 10/2010 | Carresj et al. | 701/48 |
| 2010/0274441 A1 * | 10/2010 | Carresjo | 701/33 |
| 2010/0274607 A1 * | 10/2010 | Carresj et al. | 705/7 |
| 2011/0152632 A1 | 6/2011 | Le Neel et al. | |
| 2013/0062947 A1 | 3/2013 | Probst et al. | |

FOREIGN PATENT DOCUMENTS

| | | |
|---|---|---|
| DE | 10 2008 036 554 | 2/2010 |
| WO | 2010/016025 | 2/2010 |

* cited by examiner

POSITION MEASURING DEVICE

FIELD OF THE INVENTION

The present invention is directed to a position measuring device for the communication with wireless peripheral units.

BACKGROUND INFORMATION

Position measuring devices are in wide use, especially for tool machines and in automation technologies. They are used to determine the absolute position of two objects that can move relative to each other. A basic distinction is made between linear and angle-measuring devices. Linear measuring devices, for example, are employed to determine the absolute position of two machine components of a tool machine that are able to move relative to each other. For this purpose, a measuring standard, e.g., in the form of a scale having a code track, is connected to one of the two objects, and a scanning unit is connected to the other, so that the extent of the motion of the two objects with respect to each other along the code track is able to be ascertained by scanning the code track.

Angle-measuring devices, also referred to as rotary encoders, are designed according to the same principle. Instead of the scale, however, a circular disk on whose periphery the code track is applied is used as measuring standard. The disk is connected to a shaft to be measured in torsionally fixed manner, whereas the scanning unit is fixedly mounted in relation thereto.

Certain conventional position measuring devices generate absolute positional values, and they include a digital, usually serial, interface for the communication with sequential electronics, e.g., a numerical control.

Optical, magnetic, inductive or capacitive scanning units may be used to generate positional signals.

In many technical application fields in which position measuring devices are used, additional peripheral units must be placed in the environment of the position measuring devices. These are, in particular, sensors for measuring operating parameters of the system at which the position measuring device is operated, such as temperature, vibration and moisture sensors. Another group of peripheral units are data storage units in which system-relevant information is stored or can be stored. Since the measured values or the information of the peripheral units are/is frequently also needed in the position measuring device, and since the position measuring device is already connected to the control via a fast serial interface as it is, the option of connecting peripheral units directly to the position measuring device was created in order to simplify the wiring of the system and to provide for the communication between control and peripheral units using an expanded interface protocol of the fast serial interface.

German Published Patent Application No. 103 06 231, for instance, describes an electronic intermediate module, to which a plurality of peripheral units can be connected and which is connected to the position measuring device via an additional interface.

In contrast, German Published Patent Application No. 10 2006 041 056 describes a position measuring device which has still further terminals for additional sensors, apart from a sensor for detecting the angle of rotation of a shaft.

The previous approaches have the disadvantage that the electrical connection of the peripheral units causes extra expense. This is true especially when the peripheral units are situated on movable units of the system.

SUMMARY

Example embodiments of the present invention provide an improved position measuring device.

Hereinafter, a position measuring device is described, which includes
a position detection unit, by which positional signals that result from scanning a code track by a scanning unit are able to be processed into digital positional values,
a first interface unit for the communication with a control unit via a data transmission channel, and
a second interface unit for the communication with at least one peripheral unit,
the first interface unit being a hard-wired interface, and the second interface unit being a wireless radio interface.

Further features and aspects of example embodiments of the present invention and details pertaining thereto are described in more detail below with reference to the appended Figures.

DETAILED DESCRIPTION

Figure 1:
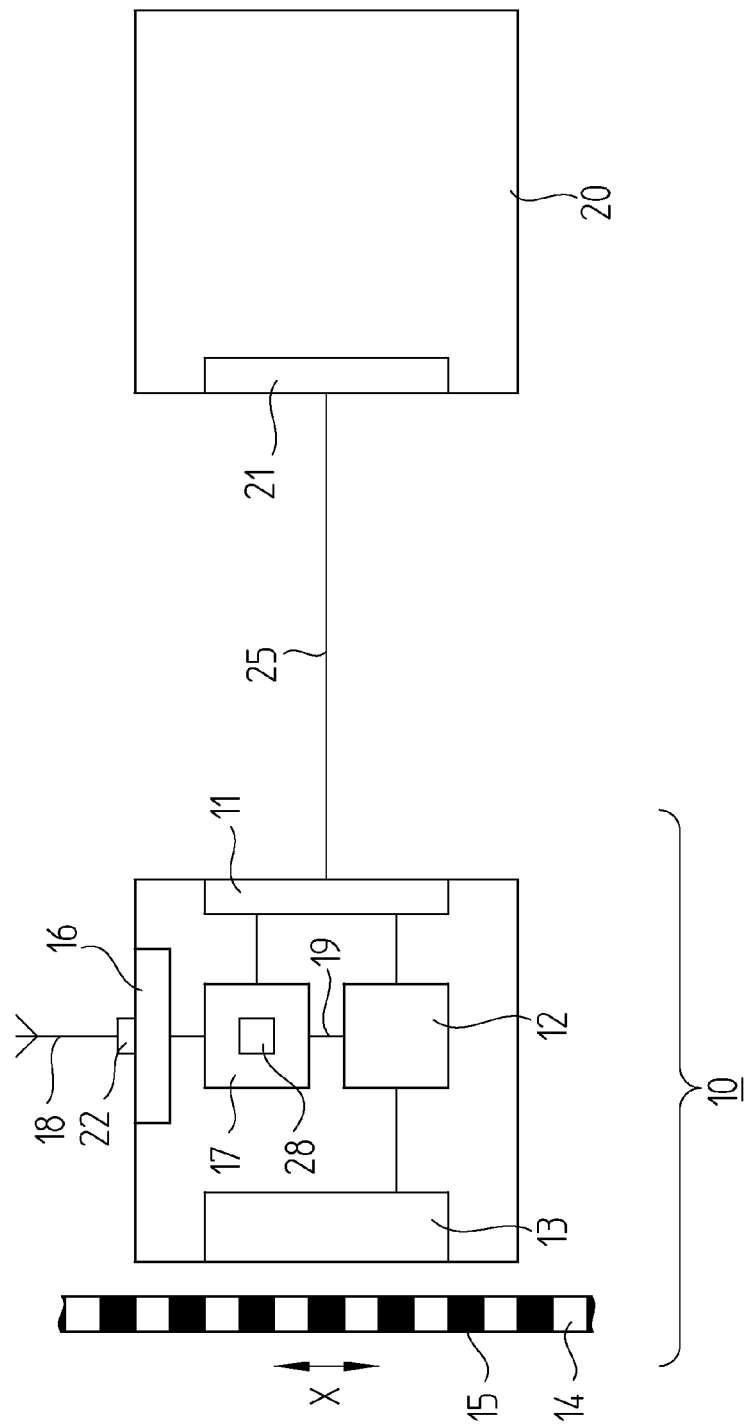
FIG. 1 is a block diagram of a position measuring device according to an example embodiment of the present invention.

FIG. 1 shows a block diagram of a position measuring device 10 according to an example embodiment of the present invention, together with a control unit 20 and multiple peripheral units 30.

To generate positional values, position measuring device 10 includes a position detection unit 12, which processes positional signals obtained by a scanning unit 13 by scanning a code track 15 on a measuring standard 14 into digital positional values. Measuring standard 14, code track 15 and scanning unit 13 are arranged according to the physical principle on which the scanning is based. For example, if optical transmitted light-scanning takes place, the measuring standard is made of glass, and code track 15 is formed by transparent and opaque sections. The scanning signals which are processed into digital positional values in the position detection units are obtained by imaging code track 15 in an imaging window on photo detectors in scanning unit 13 using a light source.

The physical scanning principle is not of importance. In addition to optical scanning principles, it is also possible to use magnetic, inductive or capacitive scanning principles. It is also possible to use incremental or absolute encoding for code track 15. It is important that the positional signals generated by scanning unit 13 are able to be processed into digital positional values by position detection unit 12.

For the communication with a control unit 20, position measuring device 10 has a first interface unit 11, which is connected via a data transmission channel 25 to a control interface 21 of control unit 20. The data transmission takes place in serial form and is, for example, bidirectional, thereby providing the option of requesting data from position measuring device 10 as well as transmitting data to position measuring device 10. Commands are specified for controlling the communication, which are transmitted from control unit 20 to first interface unit 11 and which determine whether a write or read access takes place. The data transmission according to the EnDat standard is especially suitable.

According to example embodiments of the present invention, a second interface unit 16, which is a radio interface, is situated in position measuring device 10. Second interface unit 16 thus is suitable for communicating with any number of peripheral units 30, three of which being illustrated in FIG. 1 for example, without a direct connection through electrical lines.

Peripheral units 30 are sensors for measuring physical quantities, for instance. Example of such sensors are temperature, vibration, acceleration, air humidity and air pressure sensors. To be mentioned in this context are sensors for determining deformations on mechanical components such as machine parts, but also on workpieces to be machined.

Another example of peripheral units 30 are data storage units. Suitable are read-only memories (ROM) as well as rewritable memories (EEPROM, flash memory, FRAM, etc.). The former may be used as so-called electronic type plate, for instance, the latter for storing and reading out operating information obtained while the machine on which position measuring device 10 is operated is running.

Peripheral units 30 may be both active and passive. Active peripheral units 30 require a battery or some other energy supply for the communication with second interface unit 16 of position measuring device 10. Passive, or energy-autonomous, peripheral units 30 obtain the operating voltage required to communicate with second interface unit 16 from, for example, the energy of the electromagnetic field transmitted by second interface unit 16, or from other available energy sources, such as the ambient temperature, vibrations, pressure or air flows. This method of generating an operating voltage from such energy sources is referred to under the technical term "energy harvesting".

A communication unit 17 may be situated between first interface unit 11 and second interface unit 16. Communication unit 17 may be provided, in particular, if interface units 11, 16 have different processing rates or priorities. It may occur that control unit 20 requires positional values from position measuring device 10 on a continuous basis as positional actual values for a control loop. For highly dynamic control processes, it is of importance to obtain current positional values as quickly as possible in order to minimize dead time of the control. For this reason, control unit 20 requests positional values from position measuring device 10 at short time intervals via data transmission channel 25 and first interface unit 11 while the machine it controls is in operation. Thus, the request of positional values is time-critical and therefore has high priority. On the other hand, the communication with peripheral units 30 is usually non-critical with regard to time, since measured values from peripheral units 30 (if these are sensors) change only slowly, and stored values (if data storage units are involved) do not change at all. Furthermore, radio interfaces are usually slower than hard-wired interfaces, so that a wait time would result in a direct request, e.g., of a sensor value, from control unit 20 via first interface unit 11 to second interface unit 16, whereas first interface unit 11 would be blocked and not available for transmitting positional values.

In order to avoid such a blockage of first interface unit 11, communication unit 17 may be arranged such that it receives commands that are directed to a peripheral unit 30 from first interface unit 11, processes the communication with peripheral unit 30 on its own, and buffer-stores input data received from peripheral unit 30 in a data storage unit 28, e.g., a register, until the data are fetched by first interface unit 11 at a later point in time.

In the same manner, output data to be transmitted from the control unit to a peripheral unit 30 may be buffer-stored in data storage unit 28, until the output to appropriate peripheral unit 30 takes place.

Assignment information in connection with the input and/or output data is able to be stored as well.

If peripheral units 30 are sensors, communication unit 17 may request measured values from peripheral units 30 at certain time intervals even without a request command of control unit 20 and may make the values available in data storage unit 28. If a request command for sensor data then arrives from control unit 20 via first interface unit 11, a stored, sufficiently current measured value is immediately able to be transmitted to control unit 20.

To allow direct processing of data from peripheral units 30 in position measuring device 10, communication unit 17 and position detection unit 12 may be interconnected via a data link 19 for data-transmission purposes. In this manner, for instance, it is then possible to use measured values of one or more temperature sensor(s) in position detection unit 12 to correct the positional value, or to utilize data from a data memory ("electronic type plate") for the configuration of position measuring device 10 or for its adaptation to the machine on which it is being operated.

For the reception and transmission of radio signals, second interface unit 16 is connected to a main antenna 18, which is dimensioned according to the transmission standard or the operating frequency range of the radio interface. In particular, main antenna 18 may be a dipole antenna or a spiral antenna, which possibly may be formed by circuit tracks on a circuit board. Depending on the position and placement of peripheral units 30, main antenna 18 may also be directly integrated into the housing of position measuring device 10. In this case, main antenna 18 may be configured as a slot antenna. In the same manner, main antenna 18 is able to be mounted at a distance from position measuring device 10, possibly in order to evade shielding material that is located between position measuring device 10 and peripheral units 30 with which position measuring device 10 is to communicate. If this is the case, a plug connector 22, such as a coaxial plug connector, may be provided on position measuring device 10, so that the connection between main antenna 18 with plug connector 22 via a suitable cable is reversible. Peripheral antennas 31 are situated on peripheral units 30 as counterparts to main antenna 18 of position measuring device 10.

Second interface unit 16 may be arranged as an RFID read unit or read/write unit, and RFID transponders may be used as peripheral units 30. RFID technology is widely used, cost-effective and reliable. In addition, this technology is especially suitable for using energy-autonomous peripheral units 30, which draw the energy required for their operation from the radio waves emitted by second interface unit 16.

As an alternative, second interface unit 16 may be arranged as a Near Field Communication interface, Bluetooth interface, ZigBee interface or read unit for SAW sensors.

Figure 2:
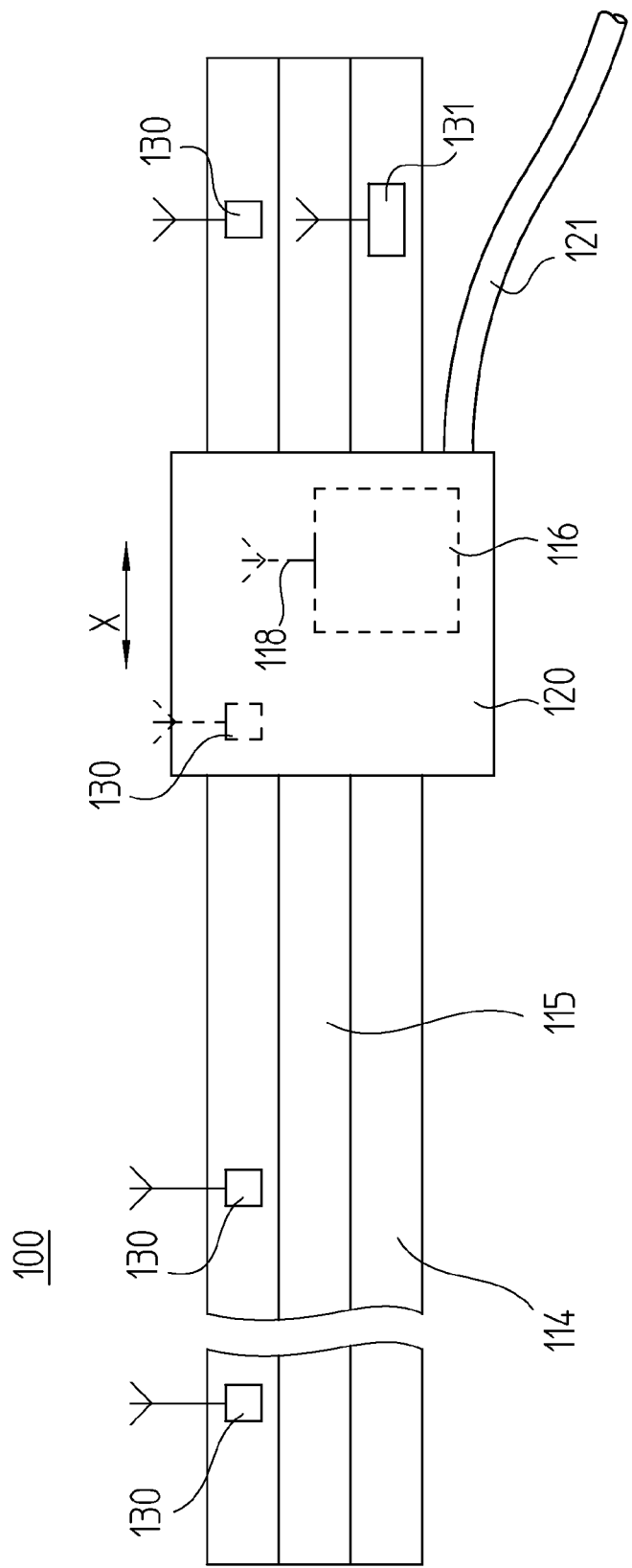
FIG. 2 illustrates a position measuring device according to an example embodiment of the present invention, in the form of a linear measuring device.

FIG. 2 shows a position measuring device according to an example embodiment of the present invention, in the form of a linear measuring device 100. It includes as a measuring standard a scale 114 having a code track 115, and a scanning head 120. In addition, a connection cable 121 is provided, which is able to connect position measuring device 100 to a control unit 20. Connection cable 121, for instance, includes data transmission channel 25 for the data transmission between first interface unit 11 and control interface 21, as well as supply lines that supply scanning head 120 with an operating voltage. For reasons of clarity, only second interface unit 116 with main antenna 118 is shown in scanning head 120, and the remaining components (first interface unit 11, position detection unit 12, scanning unit 13, and communication unit 17) are not illustrated. For an operation on a machine, scale 114 is mounted on a first machine component, and scanning head 120 on a second machine component. In a relative movement of the first machine part in relation to the second machine part in a measuring direction X, scanning head 120 (and thus scanning unit 13, which is not shown) move(s) along code track 115 of scale 114. The positional signals generated in this manner are processed, as described with reference to FIG. 1.

Mounted at regular intervals along scale 114 are peripheral units 130 in the form of temperature sensors. Because of the wireless communication between the temperature sensors and second interface unit 116, it is possible to determine the temperature distribution along scale 114 and possibly use it in the correction of the positional values. This may take place both in control unit 20, but also already in scanning head 120, e.g., in position-detection unit 12, to which communication unit 17 supplies the temperature values via data link 19. The latter is particularly advantageous since there is no need to also transmit the temperature values to control unit 20, in addition to the position values.

Peripheral units 130 in this exemplary embodiment are arranged as passive sensors, since it is possible to dispense with external wiring of peripheral units 130 entirely in such a case. In a conventional approach, on the other hand, at least two lines must be routed to each peripheral unit 130 and connected to scanning head 120, either separately or in the form of a bus connection, or directly to control unit 20.

As an alternative, peripheral units 130 may also be mounted on various machine parts or even on a workpiece to be processed, in order to detect temperature fluctuations or to correct them, as the case may be.

This exemplary embodiment is not restricted to temperature sensors. Instead, any type of other sensor may be used as well, such as vibration sensors for detecting impermissible vibrations at the machine, perhaps caused by "rattling" of a milling head or by a defective bearing.

Depending on the arrangement of second interface unit 116 and possibly main antenna 118, the range of the communication may be selected large enough so that all peripheral units 130 are able to be reached at any position of scanning head 120. However, it may also be advantageous to select a very small range for second interface unit 116, so that only peripheral units 130 in the immediate environment of scanning head 120 are able to be read out, for instance in order to detect local temperature fluctuations.

FIG. 2 shows another peripheral unit 131, which is a data storage unit. The data storage unit may contain information that relates to position measuring device 100 itself, but also to the machine on which position measuring device 100 is operated. For example, data storage unit 131 may include correction data describing measuring standard 114 and, in particular, code track 115. This correction data is required by position detection unit 12 in order to allow it to correct positional values in optimal manner. This is of importance, in particular, in the case of so-called open linear measuring devices, because the attachment of the scale to the machine and the installation and adjustment of scanning head 120 relative to code track 115 frequently takes place at the customer's facilities at the earliest. Because of the use of a data storage unit 131, which is able to be read out wirelessly via the radio interface both with regard to the data transmission and with regard to the voltage supply, the adjustment of scanning head 120 to measuring standard 114 may be performed in automated manner and thus is able to be carried out in a reliable manner that is convenient for the customer.

Data storage unit 131 may be arranged as a read-only memory (ROM) or as a read/write memory (e.g., EEPROM, flash memory, FRAM, etc.). In the latter case, information relating to the operation of position measuring device 10 may be stored in data storage unit 131, such as a serial number of scanning head 120, the date of initial operation, or the number of operating hours, for instance.

Especially in the case of data storage unit 131 it may be advantageous to restrict the range of second interface unit 116, for the reason that the content of the data storage unit relates directly to position measuring device 100. If two similar position measuring devices 100 with data storage unit 131 are installed in close proximity to each other, this prevents that the wrong data storage unit 131 will mistakenly be used for the adaptation between scale 114 and scanning head 120. In this context it is especially advantageous to place main antenna 118 of second interface unit 116 on the side of scanning head 120 facing toward scale 114.

Data storage unit 131 may be arranged as an RFID transponder, and second interface unit 116 may be arranged as an RFID reader unit or write/read unit, the system being dimensioned as a so-called close-coupling system featuring a range of few centimeters.

A near-field communication (NFC) interface may be provided as second interface unit 116 and to implement data storage unit 131 as an NFC transponder.

Figure 3:
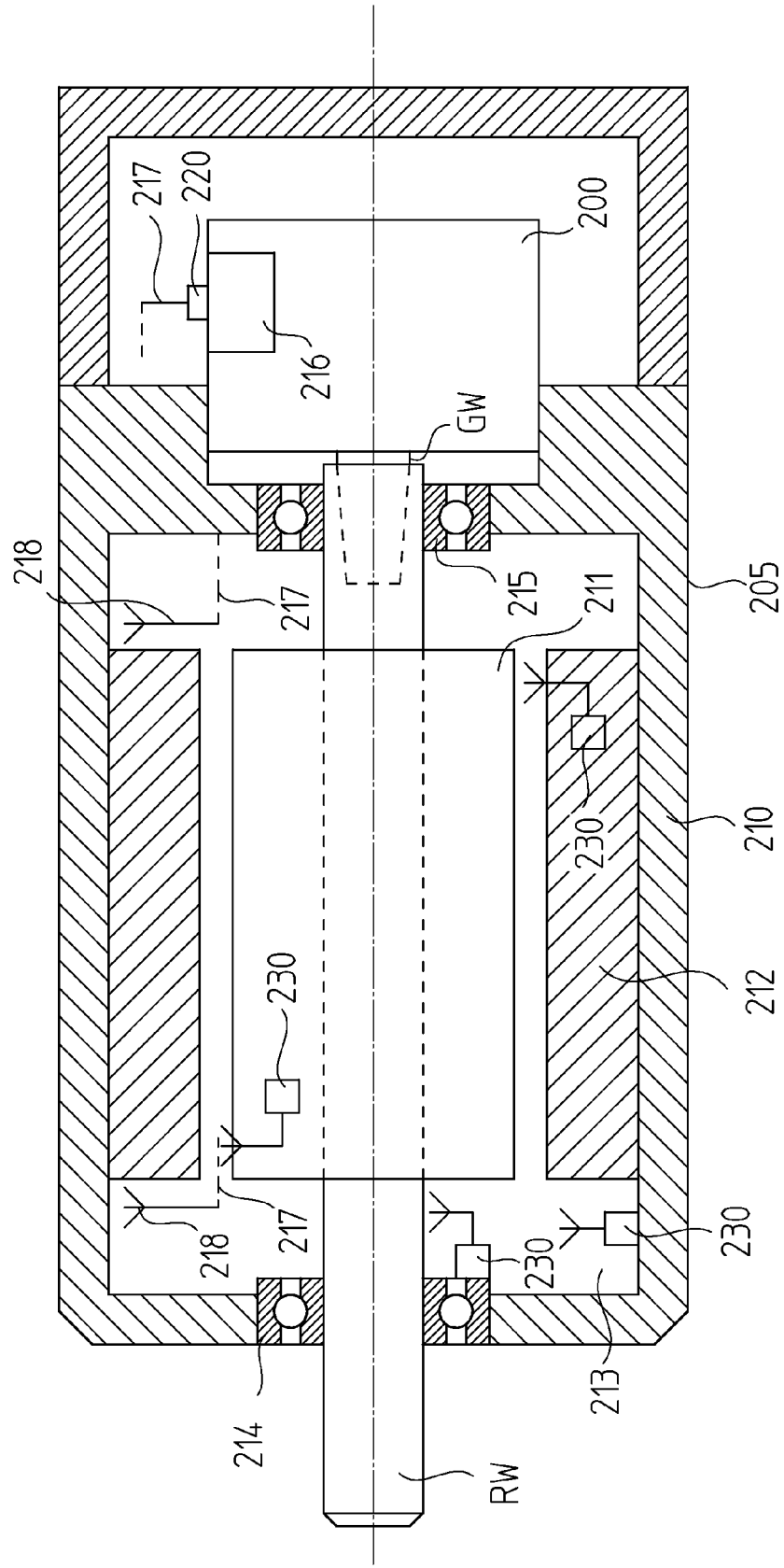
FIG. 3 illustrates a position measuring device according to an example embodiment of the present invention, in the form of a drive transducer on an electric motor.

FIG. 3 shows a position measuring device according to an example embodiment of the present invention, in the form of a drive transducer 200. Drive transducer 200 is installed on an electric motor 205. Electric motor 205 includes a rotor 211 having a rotor shaft RW, as well as stator windings 212. Rotor shaft RW is supported with the aid of radial bearings 214, 215 at two locations in a manner that allows it to rotate about its axis of rotation. Radial bearings 214, 215 may be arranged as roller bearings, especially ball bearings. Rotor shaft RW of rotor 211 of electric motor 205 is connected to an encoder shaft GW of the drive transducer 200 in rotationally fixed manner. The housing of drive transducer 200 is fixed in place on motor housing 210 of electric motor 205, so that drive transducer 200 is able to be used to measure the angle of rotation or the number of complete rotations of rotor shaft RW in relation to motor housing 210. The method of functioning of drive transducer 200 is based on scanning a code track, which is situated radially on a circular disk which represents the measuring standard, the center point of the disk in turn being joined to the axis of rotation of encoder shaft GW in rotationally fixed manner. This principle is conventional and therefore will not be discussed here in greater detail.

The structure of drive transducer 200 corresponds to the structure of position measuring device 10 illustrated in FIG. 1. Components that are not relevant (measuring standard 14, first interface unit 11, position detection unit 12, scanning unit 13, and communication unit 17) for the description of the particular arrangement in FIG. 1 once again have not been illustrated. Only second interface unit 216 is shown. A plurality of peripheral units 230 are disposed in motor interior 213 of electric motor 205 and used for monitoring the state of electric motor 205. Peripheral units 230 at axial bearings 214, 215 in particular are vibration sensors, and those on motor housing 210, in rotor 211, and in stator windings 212 are temperature sensors.

Since shielding material (e.g., motor housing 210) is usually located between drive transducer 200 and motor interior 213 in such a system, at least one main antenna 218 is disposed in motor interior 213 in this example and connected to second interface unit 216 of drive transducer 200 via an antenna cable 217. Appropriate recesses, for example, are provided in motor interior 213 for the installation of antenna cable 217. To make the connection reversible, the connection is implemented via a plug connector 220.

It should be understood that the exemplary embodiments described herein are not intended to be limiting, and that additional variants of position measuring devices may be provided within the present framework.

What is claimed is:

1. A position measuring device, comprising:
    a position detection unit adapted to process positional signals, that result from scanning a code track by a scanning unit, into digital positional values,
    a first interface unit adapted to communicate with a control unit via a data transmission channel; and
    a second interface unit adapted to communicate with at least one peripheral unit;
    wherein the first interface unit is arranged as a wired interface and the second interface unit is arranged as a wireless radio interface.

2. The position measuring device according to claim 1, further comprising a communication unit connected to the second interface unit and adapted to control communication with the at least one peripheral unit.

3. The position measuring device according to claim 2, wherein the communication unit includes a data storage unit adapted to store input and/or output data of the at least one peripheral unit.

4. The position measuring device according to claim 2, wherein the communication unit is connected to the first interface unit, and the first interface unit is adapted to control the communication unit.

5. The position measuring device according to claim 2, wherein the communication unit is connected to the position-detection unit for internal data exchange.

6. The position measuring device according to claim 1, wherein the second interface unit includes a main antenna.

7. The position measuring device according to claim 6, wherein the main antenna is connectable to the second interface unit by a plug connector.

8. The position measuring device according to claim 1, wherein the second interface unit includes: (a) an RFID read unit or read/write unit; (b) a Near Field Communication interface; (c) a Bluetooth interface; (d) a ZigBee interface; and/or (e) read unit for SAW sensors.

9. The position measuring device according to claim 1, wherein the control unit and the peripheral unit are spatially separate.

10. A system, comprising:
    a code track;
    a scanning unit adapted to scan the code track;
    a data transmission channel;
    a control unit;
    at least one peripheral unit; and
    a position measuring device, including:
        a position detection unit adapted to process positional signals, that result from scanning the code track by the scanning unit, into digital positional values,
        a first interface unit adapted to communicate with the control unit via the data transmission channel; and
        a second interface unit adapted to communicate with the at least one peripheral unit;
    wherein the first interface unit is arranged as a wired interface and the second interface unit is arranged as a wireless radio interface.

11. The system according to claim 10, wherein the control unit and the peripheral unit are spatially separate.

12. A position measuring device, comprising:
    position detection means for processing positional signals, that result from scanning a code track by a scanning unit, into digital positional values,
    first interface means for communicating with a control unit via a data transmission channel; and
    second interface means for communicating with at least one peripheral unit;
    wherein the first interface means is arranged as a wired interface and the second interface means is arranged as a wireless radio interface.

13. The position measuring device according to claim 12, wherein the control unit and the peripheral unit are spatially separate.

* * * * *